(12) United States Patent
Choi et al.

(10) Patent No.: US 8,892,039 B2
(45) Date of Patent: Nov. 18, 2014

(54) THREE-DIMENSION (3D) GLASSES AND METHOD FOR CONTROLLING POWER AND PAIRING THEREOF

(75) Inventors: Nak-won Choi, Incheon (KR); Jae-phil Koo, Seoul (KR); Tae-hyeun Ha, Suwon-si (KR); Jung-jin Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 686 days.

(21) Appl. No.: 13/242,498

(22) Filed: Sep. 23, 2011

(65) Prior Publication Data

US 2012/0208465 A1    Aug. 16, 2012

(30) Foreign Application Priority Data

Feb. 14, 2011    (KR) ........................ 10-2011-0012980

(51) Int. Cl.
     *H04B 7/00*      (2006.01)
     *H04N 13/04*      (2006.01)

(52) U.S. Cl.
     CPC ...... *H04N 13/0438* (2013.01); *H04N 2213/008* (2013.01)
     USPC .......................................................... 455/41.2

(58) Field of Classification Search
     CPC .................................................. H04N 13/0438
     USPC .......................................................... 455/41.2
     See application file for complete search history.

(56) References Cited

U.S. PATENT DOCUMENTS

| | | | |
|---|---|---|---|
| 2011/0199466 A1* | 8/2011 | Kim et al. | 348/55 |
| 2011/0234774 A1* | 9/2011 | Satoh et al. | 348/56 |
| 2011/0267425 A1* | 11/2011 | Kim et al. | 348/43 |

\* cited by examiner

*Primary Examiner* — David Bilodeau
(74) *Attorney, Agent, or Firm* — Sughrue Mion, PLLC

(57) ABSTRACT

3D glasses and a method of controlling power and pairing thereof are provided. The method of controlling power and pairing includes: restricting supply of a specific power of 3D glasses; performing, by the 3D glasses, pairing with a display apparatus; and if it is determined that the pairing is performed, lifting the restriction on the supply of the specific power. Therefore, a user may perform pairing between the 3D glasses and the 3D display apparatus easily and prevent power of the 3D glasses from being unnecessarily wasted.

18 Claims, 5 Drawing Sheets

THREE-DIMENSION (3D) GLASSES AND METHOD FOR CONTROLLING POWER AND PAIRING THEREOF

CROSS-REFERENCE TO RELATED APPLICATION

This application claims priority from Korean Patent Application No. 2011-0012980, filed in the Korean Intellectual Property Office on Feb. 14, 2011, the disclosure of which is incorporated herein in its entirety by reference.

BACKGROUND

1. Field

Apparatuses and methods consistent with exemplary embodiments relate to three-dimensional (3D) glasses and a method for controlling power and pairing thereof, and more particularly, to 3D glasses which are interlocked with a 3D display apparatus and a method for controlling power and pairing thereof.

2. Description of the Related Art

Recently, developments in wireless communication technologies have been focused on technologies using low-cost and low-power wireless apparatuses or wireless links and thus, various technologies regarding wireless communication have been developed and realized. Bluetooth is a wireless communication method based on short-range radio technology and operates in 2.4 GHz Industrial, Scientific, and Medical (ISM) frequency band. Bluetooth has been widely used since it is capable of transmitting audio and data at a maximum speed of 1 Mbps in a radius of 10 m and consumes a relatively low amount of power.

In particular, a Bluetooth module is adopted by a mobile communication terminal in many cases and thus, pairing between a mobile communication terminal including a Bluetooth module and other Bluetooth apparatuses is essential. The process of pairing may be performed using authentication, a PIN code, or encryption. Authentication is a process of determining whether to exchange a PIN code (e.g., a pass key) to be connected with another Bluetooth apparatus, a PIN code is a type of a password and represents a process of unifying a PIN code between Bluetooth apparatuses, and encryption is a process of encrypting data which is exchanged by Bluetooth apparatuses.

Recently, Bluetooth has been widely used as a communication method between a 3D display apparatus and 3D glasses. In order for a user to watch a 3D screen using 3D glasses, authentication should be performed between the 3D glasses and a 3D display apparatus every time a 3D display apparatus is paired with 3D glasses, causing inconvenience to a user. In addition, if a 3D display apparatus is paired with 3D glasses, the power of the 3D glasses is used even when the 3D glasses are not in use.

SUMMARY

Aspects of one or more exemplary embodiments relate to 3D glasses which, if it is determined that a 3D display apparatus is paired with 3D glasses, lift restriction on power supply to the 3D glasses to which power supply has been restricted, and a method of controlling power and pairing thereof.

Aspects of one or more exemplary embodiments relate to 3D glasses which control specific power according to whether a 3D display apparatus is paired with the 3D glasses, whether it is sensed that a user wears the 3D glasses, and a scanning result of 3D data, and a method of controlling power and pairing thereof.

According to an aspect of an exemplary embodiment, there is provided a method of controlling power and pairing of 3D glasses, the method including: restricting supply of a specific power of 3D glasses; performing pairing with a display apparatus; and if it is determined that the pairing is performed, lifting the restriction on the supply of the specific power.

The performing the pairing may include sensing a user's key input and performing the pairing with the display apparatus according to the sensing.

The key input may include at least one of a power key input and a pairing key input.

The key input may include an input to a key on the 3D glasses.

The performing the pairing may include sensing whether a user wears the 3D glasses and performing the pairing with the display apparatus according to the sensing.

The specific power may correspond to power regarding at least one of a sensor and a shutter of the 3D glasses.

The specific power may correspond to power regarding at least one of an accelerator sensor and a touch sensor of the 3D glasses.

The restricting may include suspending the supply of the specific power by interruption of a sensing unit of the 3D glasses.

The performing the pairing may include: sensing a pairing request signal; and if the pairing is a first pairing, the pairing is performed when the pairing request signal is sensed continuously for a first period of time, and if the pairing is not the first pairing, the pairing is performed when the pairing request signal is sensed continuously for a second period of time.

The first period of time may be shorter than the second period of time.

According to an aspect of another exemplary embodiment, there is provided a method of controlling power and pairing of 3D glasses, the method including: performing pairing with a display apparatus; sensing whether a user wears the 3D glasses; scanning whether 3D data is input; and controlling specific power of the 3D glasses according to a result of the pairing, the sensing and the scanning.

The 3D data may include sync information between the display apparatus and the 3D glasses.

The sensing may use at least one of an accelerator sensor and a touch sensor.

The specific power may correspond to power of at least one of a control unit, a sensing unit, and a shutter on/off unit of the 3D glasses.

The controlling the specific power may include suspending the supply of the specific power if the 3D data is not scanned for a predetermined period of time.

The controlling the specific power may include suspending the supply of the specific power if an operation of sensing whether the user wears the 3D glasses is repeated for more than a predetermined number of times.

The method may further include, if an operation voltage of a sensor for the sensing is below a predetermined voltage, providing an alarm to a user.

The performing the pairing may include sensing a pairing request signal, and if the pairing is a first pairing, the pairing is performed when the pairing request signal is sensed continuously for a first period of time, and if the pairing is not the first pairing, the pairing is performed when the pairing request signal is sensed continuously for a second period of time.

The first period of time may be shorter than the second period of time.

According to an aspect of another exemplary embodiment, there is provided 3D glasses including: a power supply unit which provides specific power of 3D glasses; a communication unit which performs pairing with a display apparatus; and a control unit which lifts restriction on supply of the specific power of the 3D glasses if the pairing is performed with the display apparatus while supply of specific power of the 3D glasses is restricted.

The 3D glasses may further include a key input unit which senses a user's key input, and the control unit may control to perform the pairing with the display apparatus according to a sensing result by the key input unit.

The key input may include at least one of a power key input and a pairing key input.

The key input may be an input to a key on the 3D glasses.

The 3D glasses may further include a sensing unit which senses whether a user wears the 3D glasses, and the control unit may control to perform pairing with the display apparatus according to a sensing result of the sensing unit.

The specific power may include power regarding at least one of a sensor and a shutter of the 3D glasses.

The specific power may include power regarding at least one of an accelerator sensor and a touch sensor of the 3D glasses.

The restricting may include suspending the supply of the specific power by interruption of a sensing unit of the 3D glasses.

The control unit, if the pairing is a first pairing, may perform pairing when the pairing request signal is sensed continuously for a first period of time, and if the pairing is not the first pairing, perform pairing when the pairing request signal is sensed continuously for a second period of time.

The first period of time may be shorter than the second period of time.

According to an aspect of another exemplary embodiment, there is provided 3D glasses including: a power supply unit which provides a specific power of 3D glasses; a communication unit which performs pairing with a display apparatus; and a control unit which scans whether 3D data is input through the communication unit and controls the specific power of the 3D glasses according to a result of the pairing, a sensing by a sensing unit of whether a user wears the 3D glasses, and the scanning.

The 3D data may include sync information between the display apparatus and 3D glasses.

The sensing unit may include at least one of an accelerator sensor and a touch sensor.

The specific power may correspond to power of at least one of the control unit, the sensing unit, and a shutter on/off unit of the 3D glasses.

The control unit, if the 3D data is not scanned for a predetermined period of time, may control to suspend the supply of the specific power.

The control unit, if an operation of sensing whether the user wears the 3D glasses is repeated for more than a predetermined number of times according to a sensing result of the sensing unit, may control to suspend supply of the specific power.

The 3D glasses may further include an alarming unit which, if an operation voltage of a sensor for the sensing is below a predetermined voltage, provides an alarm to the user.

The control unit, if the pairing is a first pairing, may perform the pairing when the pairing request signal is sensed continuously for a first period of time, and if the pairing is not the first pairing, perform the pairing when the pairing request signal is sensed continuously for a second period of time.

The first period of time may be shorter than the second period of time.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
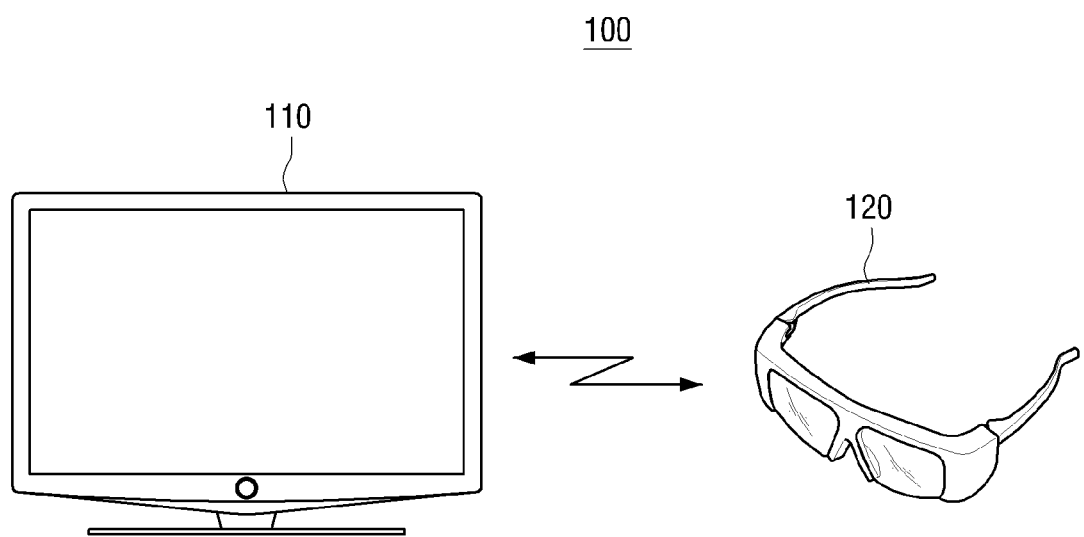
FIG. 1 is a view illustrating a 3D image providing system according to an exemplary embodiment.

Certain exemplary embodiments are described in greater detail below with reference to the accompanying drawings.

In the following description, like drawing reference numerals are used for the like elements, even in different drawings. The matters defined in the description, such as detailed constructions and elements, are provided to assist in a comprehensive understanding of exemplary embodiments. However, exemplary embodiments can be practiced without those specifically defined matters. Also, well-known functions or constructions are not described in detail since they would obscure the description with unnecessary detail. Hereinafter, expressions such as "at least one of," when preceding a list of elements, modify the entire list of elements and do not modify the individual elements of the list.

FIG. 1 is a view illustrating a 3D image providing system 100 according to an exemplary embodiment. As illustrated in FIG. 1, the 3D image providing system 100 includes a 3D display apparatus 110 for displaying a 3D image on a screen and 3D glasses 120 for watching a 3D image.

The 3D display apparatus 110 receives the 3D image from an image device such as a photographing apparatus, a camera, etc., or from a broadcasting station where the 3D image has been transmitted to after at least one of editing and processing, and then processes the 3D image, and displays the processed 3D image on the screen. In particular, the 3D display apparatus 110 processes a left eye image and a right eye image taking into account the format of the 3D image, and enables the processed left eye image and the right eye image to be displayed alternately in a timesharing manner.

In addition, the 3D display apparatus 110 generates a sync signal which is synchronized with a timing when the left eye image or the right eye image is displayed in a timesharing manner and transmits the sync signal to the 3D glasses 120. Herein, the sync signal is generated as a plurality of pulses occur periodically at every Vsync signal of the display apparatus 110.

In this case, the 3D display apparatus 110 may be embodied as a 3D TV, a 3D projector, and a 3D monitor.

The 3D glasses 120 open and close left eye glasses and right eye glasses alternately according to a sync signal received from the 3D display apparatus 110 so that a user may watch a left eye image and a right eye image through the left eye and the right eye, respectively.

In particular, the 3D glasses 120 perform pairing with the 3D display apparatus 110 by sensing whether a key is input by a user or whether a user wears the 3D glasses during a sealed state, that is, while supply of specific power is restricted. If the pairing with the 3D display apparatus 110 is performed, the 3D glasses 120 lift the restriction on power supply to specific power and provide power to the specific power of the 3D glasses.

In addition, after the 3D glasses 120 are unsealed, the 3D glasses 120 restrict power supply to specific power of the 3D glasses 120 depending on whether pairing has been performed, whether a user wears the 3D glasses, and whether 3D data is received and scanned.

Figure 2:
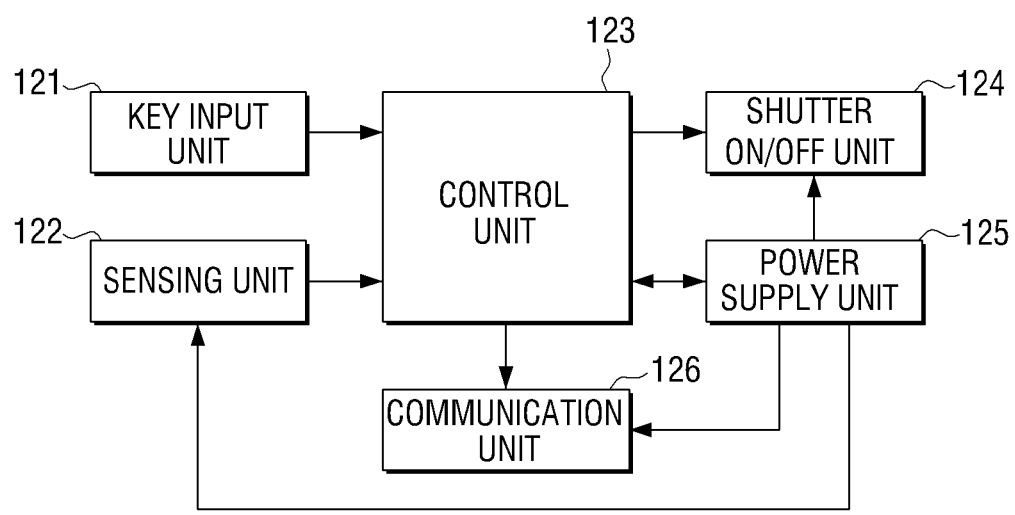
FIG. 2 is a view illustrating a block diagram of 3D glasses according to an exemplary embodiment.

Hereinafter, the 3D glasses 120 according to an exemplary embodiment will be explained with reference to FIG. 2. As illustrated in FIG. 2, the 3D glasses 120 according to an exemplary embodiment include a key input unit 121, a sensing unit 122, a control unit 123, a shutter on/off unit 124, a power supply unit 125 and a communication unit 126.

The key input unit 121 includes a power key input unit which receives a power supply command of the 3D glasses 120 and a pairing key input unit which receive a command for performing pairing of the 3D display apparatus 110. In this case, the power key input unit and the pairing key input unit may be embodied as buttons provided on the 3D glasses 120.

Figure 3:
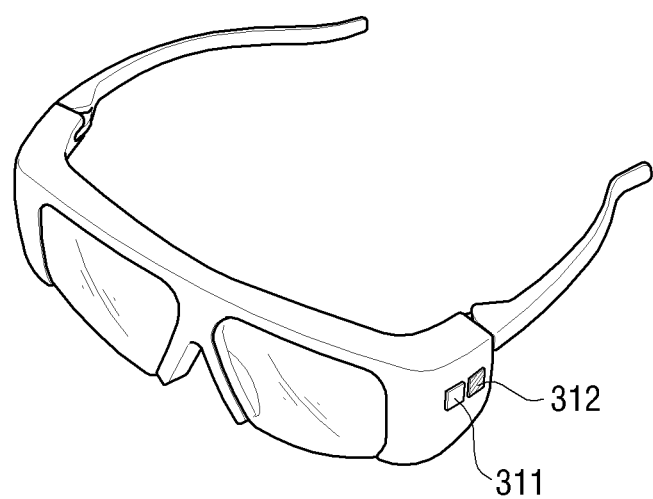
FIG. 3 is a view illustrating a key input unit disposed on 3D glasses according to an exemplary embodiment.

Specifically, as illustrated in FIG. 3, the power key input unit 311 and the pairing key input unit 312 may be disposed on the frame of the glasses 120.

In particular, if the power key input unit 311 is selected, the 3D glasses 120 control to provide power to each component of the 3D glasses 120. In addition, if a power key input unit 311 is selected for the first time in the 3D glasses 120 which are unsealed, the 3D glasses 120 may not only provide power to each component of the 3D glasses 120 but also perform pairing between the 3D glasses 120 and the 3D display apparatus 110 in a proximity to the 3D glasses 120.

In addition, if the pairing key input unit 312 is selected, the 3D glasses 120 sense a pairing request signal and perform the pairing between the 3D glasses 120 and the 3D display apparatus 110. In particular, if the pairing key input unit 312 is selected for the first time in the 3D glasses 120 which are unsealed, the pairing key input unit 312 generates a pairing request signal and the control unit 123 senses the pairing request signal so as to perform pairing between the 3D glasses 120 and the 3D display apparatus 110 in a proximity to the 3D glasses 120.

If a user wishes to perform pairing again between the 3D glasses and another 3D display apparatus, the pairing between the 3D glasses and the other 3D display apparatus 110 may be performed as the pairing key input unit 312 is selected.

In this case, if the 3D glasses are in an unsealed state, that is, if it is the first pairing, and the pairing key input unit 312 is pressed for a first period of time while pairing between the 3D glasses and the 3D display apparatus 110 is performed, the control unit 123 senses a pairing request signal for the first period of time to perform pairing between the 3D glasses 120 and the 3D display apparatus 110. When pairing is performed again between the 3D glasses and another 3D display apparatus, and the pairing key input unit 312 is pressed for a second period of time, the control unit 123 senses a pairing request signal for the second period of time to perform pairing between the 3D glasses 120 and the other 3D display apparatus. In this case, the first period of time may be shorter than the second period of time.

However, this is only an example, and another exemplary embodiment is not limited thereto. For example, according to another exemplary embodiment, respective pairings may be applied when the pairing key input unit 312 is pressed once while pairing between the 3D glasses and the 3D display apparatus 110 is performed for the first time and the pairing key input unit 312 is pressed twice in a row while pairing between the 3D glasses and the other 3D display apparatus 110 is performed again.

The sensing unit 122 senses whether a user wears the 3D glasses 120. In this case, the sensing unit 122 may be realized using at least one of an accelerator sensor and a touch sensor. However, this is only an example, and whether a user wears the 3D glasses 120 may be sensed using other sensors according to one or more other exemplary embodiments.

Figure 4:
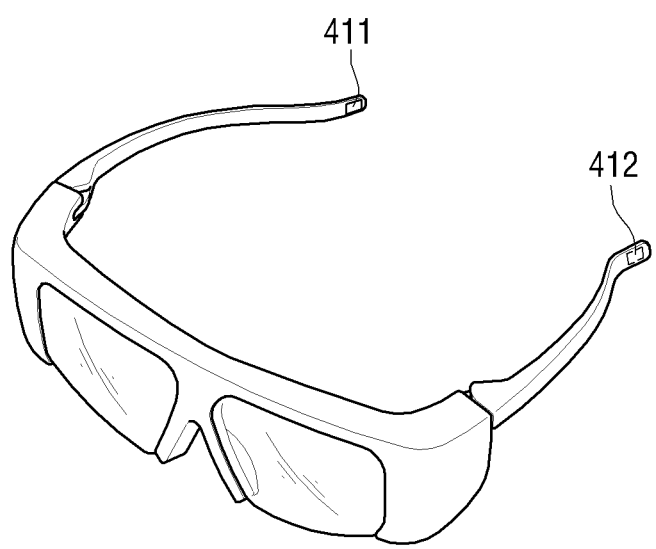
FIG. 4 is a view illustrating a sensing unit of 3D glasses according to an exemplary embodiment.

For example, according to another exemplary embodiment, as illustrated in FIG. 4, the touch sensors 411, 412 may be disposed on a position where the frame of the 3D glasses 120 comes in contact with a user's ear. However, this is only an example, and whether a user wears the 3D glasses 120 may be sensed using a touch sensor which is located in another position according to another exemplary embodiment.

The shutter on/off unit 124 operates a shutter according to a control signal generated by the control unit 123. In particular, the shutter on/off unit 124 includes a left eye shutter and a right eye shutter and turns on and off the left eye shutter and the right eye shutter alternately according to a control signal which is generated based on a sync signal received from the 3D display apparatus 110.

The power supply unit 125 provides power to the components of the 3D glasses 120 under the control of the control unit 123. In particular, the power supply unit 125 provides or restricts power to a specific component of the 3D glasses 120 according to whether pairing with the 3D display apparatus 110 has been performed, whether it is sensed that a user wears the 3D glasses 120, and whether 3D date has been scanned.

The communication unit 126 performs communication with the 3D display apparatus 110. In particular, the communication unit 126 performs pairing in order to communicate with the 3D display apparatus 110. Specifically, the pairing may be performed using at least one of authentication, a PIN code, encryption, etc. Authentication is a process of determining whether to exchange a PIN code (e.g., a pass key) to be connected with another Bluetooth apparatus, a PIN code is type of a password and represents a process of unifying a PIN code between Bluetooth apparatuses, and encryption is a process of encrypting data which is exchanged by Bluetooth apparatuses. In this case, the communication unit 126 may operate using a Bluetooth module. However, this is only an example, and pairing with the 3D display apparatus 110 may be performed using another type of communication module and method.

Once pairing with the 3D display apparatus 110 is performed, the communication unit 126 receives 3D data from the 3D display apparatus 110. In this case, the 3D data may include sync information between the 3D display apparatus 110 and the 3D glasses 120.

The control unit 123 controls the overall operation of the 3D glasses 120 according to a user's input received through at least one of the user key input unit 121 and the sensing unit 122.

In particular, the control unit 123 performs pairing with the 3D display apparatus 110 according to whether a user's input is received by the key input unit during a sealed state (that is, while supply of power is restricted). Specifically, if the power key input unit 311 or the pairing key input unit 312 is selected, the control unit 123 attempts to perform pairing with the 3D display apparatus 110.

If pairing with the 3D display apparatus 110 is performed, the control unit 123 lifts restriction on power supply to specific power of the 3D glasses. Specifically if pairing with the 3D display apparatus 110 is performed, the control unit 123 lifts restriction on power supply to the sensing unit 122 of the 3D glasses 120 to supply power to the sensing unit 122.

If power is supplied to the sensing unit 122, the control unit 123 senses whether a user wears the 3D glasses 120 through the sensing unit 122 and controls power supply of the 3D glasses 120 accordingly. Specifically, if the control unit 123 does not sense that a user wears the 3D glasses 120 through the sensing unit 122, the control unit 123 suspends power supply of the 3D glasses 120 again.

In addition, if the operation of sensing whether a user wears 3D glasses is repeated for more than a predetermined number of times, the control unit 123 may suspend supply of specific power of the 3D glasses 120 again.

Once the sensing unit 122 senses whether a user wears 3D glasses, the control unit 123 scans whether 3D data, that is, a sync signal, is received through the communication unit 126. If 3D data is scanned, the control unit 123 operates the shutter on/off unit 124 to allow a user watch a 3D image which is output from the 3D display apparatus 110.

If 3D data is not scanned for a predetermined period of time, the control unit 123 suspends supply of specific power of the 3D glasses 120 again. In this case, the predetermined period of time may represent an approximate time for a user to manipulate a remote controller with reference to a user's manual, for example, 5 minutes. However, this is only an example, and the predetermined period of time may be set by a user directly or may be a different value.

In addition, the control unit 123 may restrict power supply of the 3D glasses 120 by interruption of the sensing unit 122 of the 3D glasses 120. Specifically, if an external oscillation having a value higher than a specific value occurs while the 3D glasses 120 are preserved, the control unit 123 provides power to the components of the 3D glasses 120. In addition, if 3D data is scanned, the control unit 123 provides power to the shutter on/off unit 124. However, if 3D data is not scanned for a predetermined period of time (for example, for 10 seconds), the control unit 123 determines whether there is external oscillation again. If an external oscillation having a value higher than a specific value occurs again, the control unit 123 determines whether 3D data is scanned again. The control unit 123 determines whether external oscillation occurs and whether 3D data is input repeatedly for a predetermined number of times. If it is determined that external oscillation occurs and 3D data is input for the predetermined number of times, power is supplied to the shutter on/off unit 124, and if not, power supply of the 3D glasses 120 is suspended.

However, aspects of the present inventive concept are not limited to the above-described exemplary embodiments. For example, according to another exemplary embodiment, power supply of the 3D glasses 120 may be restricted by interruption of another sensing unit 122. For example, if an external metal approaches while the 3D glasses 120 are preserved, the control unit 123 may restrict power supply of the 3D glasses 120 by determining whether the external metal approaches and whether 3D data is input repeatedly.

In addition, the control unit 123 may perform pairing through the pairing key input unit 312 when the 3D glasses 120 are paired again after being paired for the first time. However, if the pairing is the first pairing, the control unit 123 controls to perform pairing when a pairing request signal is sensed continuously for a first period of time, and if the pairing is not the first pairing, the control unit 123 controls to perform pairing when a pairing request signal is sensed continuously for a second period of time. In this case, the first period of time may be shorter than the second period of time.

In addition, the control unit 123 may perform pairing with the 3D display apparatus 110 automatically when it is sensed that a user wears the 3D glasses 120 by the sensing unit 122.

In addition, the control unit 123 may provide an alarm or a signal to a user when the operation voltage of a sensing unit is below a specific voltage to inform that the battery of the 3D glasses 120 needs to be recharged or replaced. In this case, the alarm may be embodied as an audio signal, such as 'beep' sound, or a visual alarm signal. Alternatively, battery discharge information may be transmitted to the 3D display apparatus 110 so that the battery discharge information may be displayed through the 3D display apparatus 110.

Using the above-described 3D glasses, a user may perform pairing between the 3D glasses 120 and the 3D display apparatus 110 easily and prevent power of the 3D glasses 120 from being unnecessarily wasted.

Hereinafter, a method of controlling power and pairing of the 3D glasses 120 will be explained with reference to FIG. 5.

Figure 5:
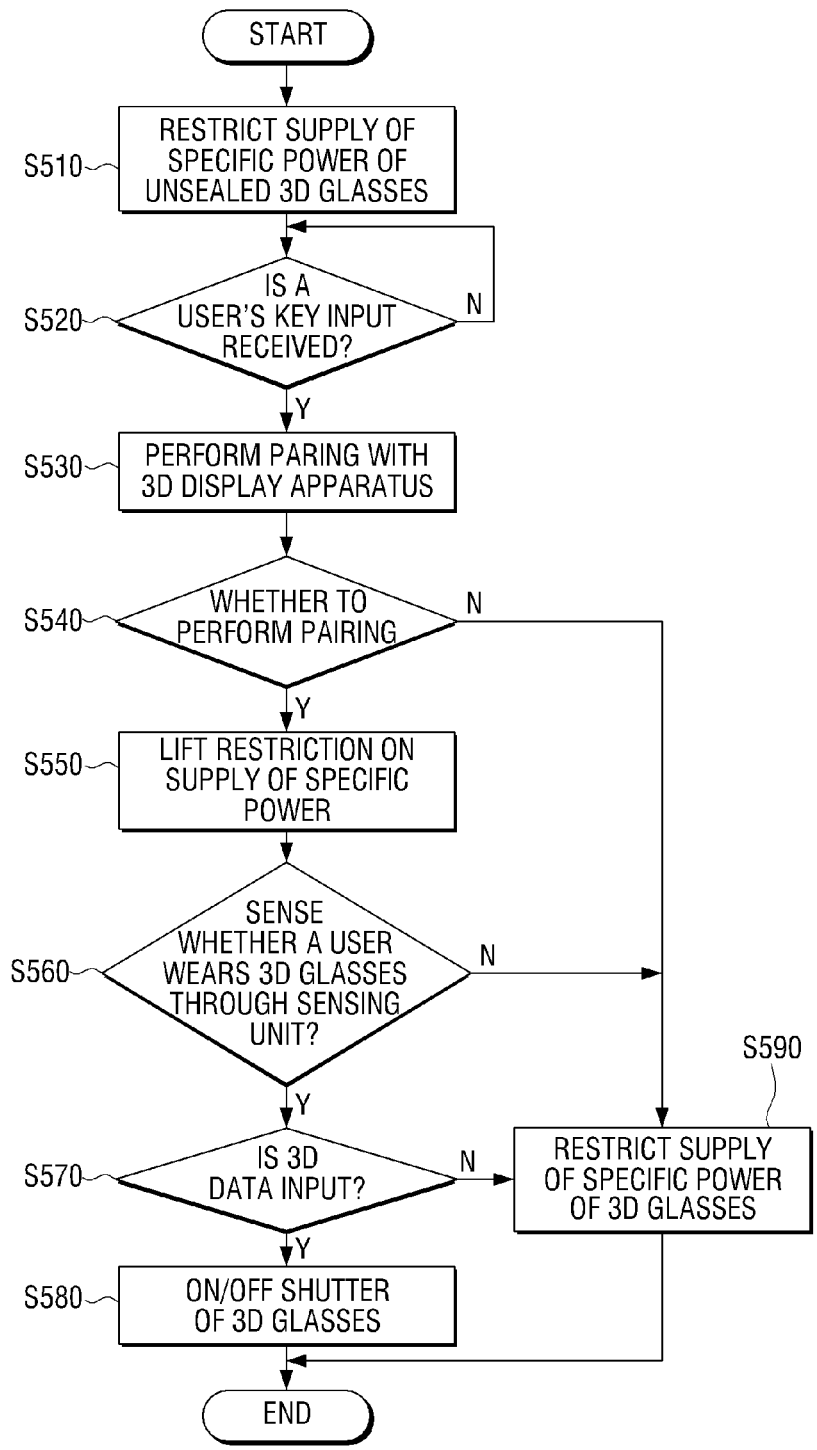
FIG. 5 is a flowchart to explain a method for controlling pairing and power of 3D glasses according to an exemplary embodiment.

FIG. 5 is a flowchart to explain a method of controlling power and pairing of the 3D glasses 120 according to an exemplary embodiment.

Power supply is restricted since the 3D glasses 120 are in a sealed state (operation S510). Subsequently, the 3D glasses 120 sense whether a user's key input is received through the user key input unit 121 (operation S520). In this case, the key input unit 121 may be the power key input unit 311 or the pairing key input unit 312.

If a user's key input is sensed (operation 5520-Y), the 3D glasses 120 perform pairing with the 3D display apparatus 110 (operation S530). In this case, if the pairing with the 3D display apparatus 110 is not performed for a predetermined period of time (operation S540-N), the 3D glasses 120 maintain a state where supply of specific power is restricted (operation S590).

However, if the pairing with the 3D display apparatus 110 is performed (operation 5540-Y), the 3D glasses 120 lift restriction on supply of specific power of the 3D glasses 120 (operation S550). Specifically, the 3D glasses 120 provide power to at least one of the sensing unit 122, the control unit 123, and the shutter on/off unit 124 of the 3D glasses 120.

In addition, the 3D glasses 120 sense whether a user wears the 3D glasses 120 using the sensing unit 122 (operation S560). If it is determined that the 3D glasses 120 are not used for a predetermined period of time (operation S560-Y), the 3D glasses 120 restrict supply of specific power of the 3D glasses 120 again (operation S590).

However, if it is determined that the 3D glasses 120 are used (operation S560-N), the 3D glasses 120 scan whether 3D data is input through the communication unit 126 (operation S570). If it is determined that the 3D glasses 120 are not input for a predetermined period of time (operation S570-N), the 3D glasses 120 restrict supply of specific power of the 3D glasses 120 again (operation S590).

However, if it is determined that 3D data is input from the 3D display apparatus 110, the 3D glasses 120 turn on/off a shutter (operation S580). That is, the 3D glasses 120 provide power to the shutter on/off unit 124 to watch a 3D image output from the 3D display apparatus 110 and operate the shutter on/off unit 124.

Through the above-described method, a user may perform pairing between the 3D glasses 120 and the 3D display apparatus 110 easily and prevent power of the 3D glasses 120 from being unnecessarily wasted.

While not restricted thereto, exemplary embodiments can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, exemplary embodiments may be written as computer programs transmitted over a computer-readable transmission medium, such as a carrier wave, and received and implemented in general-use or special-purpose digital computers that execute the programs. Moreover, one or more units of the 3D glasses can include a processor or microprocessor executing a computer program stored in a computer-readable medium.

Although a few exemplary embodiments have been shown and described, it would be appreciated by those skilled in the art that changes may be made in exemplary embodiment without departing from the principles and spirit of the inventive concept, the scope of which is defined in the claims and their equivalents.

What is claimed is:

1. A method of controlling power and pairing of 3D glasses, the method comprising:
    performing pairing between 3D glasses and a display apparatus;
    sensing whether a user wears the 3D glasses;
    scanning whether 3D data is input; and
    controlling specific power of the 3D glasses according to a result of the pairing, the sensing and the scanning.

2. The method as claimed in claim 1, wherein the 3D data comprises sync information between the display apparatus and the 3D glasses.

3. The method as claimed in claim 1, wherein the sensing comprises sensing whether the user wears the 3D glasses using at least one of an accelerator sensor and a touch sensor.

4. The method as claimed in claim 1, wherein the specific power corresponds to power of at least one of a control unit which controls operations of the 3D glasses, a sensing unit which senses whether the user wears the 3D glasses, and a shutter on/off unit of the 3D glasses.

5. The method as claimed in claim 1, wherein the controlling the specific power comprises suspending supply of the specific power if no 3D data is scanned for a predetermined period of time.

6. The method as claimed in claim 1, wherein the controlling the specific power comprises suspending the supply of the specific power if an operation of sensing whether the user wears the 3D glasses is repeated for more than a predetermined number of times without sensing that the user wears the 3D glasses.

7. The method as claimed in claim 1, wherein the performing the pairing comprises:
    sensing a pairing request signal; and
    if the pairing is a first pairing, performing the pairing when the pairing request signal is sensed continuously for a first period of time, and if the pairing is not a first pairing, performing the pairing when the pairing request signal is sensed continuously for a second period of time.

8. The method as claimed in claim 7, wherein the first period of time is shorter than the second period of time.

9. 3D glasses comprising:
    a power supply unit which provides a specific power of the 3D glasses;
    a communication unit which performs pairing with a display apparatus; and
    a control unit which scans whether 3D data is input through the communication unit and controls the specific power of the 3D glasses according to a result of the pairing, sensing whether a user wears the 3D glasses, and the scanning.

10. The 3D glasses as claimed in claim 9, wherein the 3D data comprises sync information between the display apparatus and the 3D glasses.

11. The 3D glasses as claimed in claim 9, further comprising a sensing unit which senses whether the user wears the 3D glasses,
    wherein the sensing unit comprises at least one of an accelerator sensor and a touch sensor.

12. The 3D glasses as claimed in claim 9, wherein the specific power corresponds to power of at least one of the control unit, a sensing unit which senses whether the user wears the 3D glasses, and a shutter on/off unit of the 3D glasses.

13. The 3D glasses as claimed in claim 9, wherein the control unit, if the 3D data is not scanned for a predetermined period of time, controls to suspend the supply of the specific power.

14. The 3D glasses as claimed in claim 9, wherein the control unit, if an operation of sensing whether the user wears the 3D glasses is repeated for more than a predetermined number of times according to a sensing result of a sensing unit, controls to suspend the supply of the specific power.

15. The 3D glasses as claimed in claim 9, further comprising:
    an alarming unit which, if an operation voltage of a sensor for the sensing is below a predetermined voltage, provides an alarm to the user.

16. The 3D glasses as claimed in claim 9, wherein the control unit, if the pairing is a first pairing, performs the pairing when the pairing request signal is sensed continuously for a first period of time, and if the pairing is not the first pairing, performs the pairing when the pairing request signal is sensed continuously for a second period of time.

17. The 3D glasses as claimed in claim 16, wherein the first period of time is shorter than the second period of time.

18. A non-transitory computer readable medium having recorded thereon a program executable by a computer for performing the method of claim 1.

* * * * *